United States Patent [19]

Katerberg et al.

[11] Patent Number: 4,591,869

[45] Date of Patent: May 27, 1986

[54] INK JET PRINTING APPARATUS AND METHOD PROVIDING AN INDUCED, CLEAN-AIR REGION

[75] Inventors: James A. Katerberg, Kettering; Gregory M. Kopp, Huber Heights; Michael J. Piatt, Enon, all of Ohio

[73] Assignee: Eastman Kodak Company, Rochester, N.Y.

[21] Appl. No.: 722,552

[22] Filed: Apr. 12, 1985

[51] Int. Cl.[4] .............................................. G01D 15/18

[52] U.S. Cl. ........................................ 346/1.1; 346/75; 346/140 R

[58] Field of Search ........................ 346/1.1, 75, 140 R

[56] References Cited

U.S. PATENT DOCUMENTS 4,122,457 10/1978 Erikson et al. ........................ 346/75

*Primary Examiner*—E. A. Goldberg
*Assistant Examiner*—Gerald E. Preston
*Attorney, Agent, or Firm*—John D. Husser

[57] ABSTRACT

To protect critical operative portions (e.g. the orifice plate) of ink jet printing apparatus from airborne debris particles (e.g. paper dust), a wall is provided to substantially enclose a region around those critical operative portions and filtered air is induced to flow through the enclosed region from a location proximate the operative portions to a droplet outlet. In one mode the energy of printing droplet streams induces the air flow. In another embodiment the energy of printing substrate movement induces the air flow.

27 Claims, 6 Drawing Figures

INK JET PRINTING APPARATUS AND METHOD PROVIDING AN INDUCED, CLEAN-AIR REGION

BACKGROUND OF THE INVENTION

1. Field of the Invention

The present invention relates to ink jet printing apparatus and more specifically to improved constructions and procedures in such apparatus that effect an air flow, for protecting the print head assembly from contamination, that is induced by an operative printing function(s) of the apparatus.

2. Description of the Prior Art

The term "continuous" has been used in the field of ink jet printer apparatus to characterize the types of ink jet printers that utilize continuous streams of ink droplets, e.g. in distinction to the "drop on demand" types. Continuous ink jet printers can be of the binary type (having "catch" and "print" trajectories for droplets of the continuous streams) and of the multi-deflection type (having a plurality of print trajectories for droplets of the continuous streams). Binary type apparatus most often employs a plurality of droplet streams while multi-deflection apparatus most often employs a single droplet stream.

In general, the print head assembly of continuous ink jet printing apparatus includes an ink cavity to which ink is supplied under pressure so as to issue in a stream from an orifice plate in liquid communication the cavity. Periodic perturbations are imposed on the liquid stream (e.g. vibrations by an electro-mechanical transducer) to cause the stream to break up into uniformly sized and shaped droplets. A charge plate is located proximate the droplet breakoff point and imparts electrical charge in accord with a print information signal to effect selective droplet deflection in accord with the charge borne by the droplet. A catcher is provided to catch non-printing droplets.

Certain elements of such a print head assembly, e.g. the orifice and charge plates, should be of relatively minute scale so as to provide good printing resolution. These elements must be fabricated and mounted very precisely in order to achieve quality printing. Thus dust particles are repugnate to the nature of the print head assembly; and a serious problem is presented by large volumes of print media moving in very close operative relation with the print head assembly. In other ink jet printing apparatus, e.g. drop on demand printers, it is desirable to protect at least the orifice structure from dust particles.

The most successful prior art approaches to this problem involve forcing clean (e.g. filtered) air into the region of the critical print head elements to prevent unwanted dust and debris from reaching those elements. However, the prior art approaches for providing the protective air flow have certain disadvantages. First, the external blowers used to provide such a protective air flow add cost, size, energy usage and noise to the printing apparatus. When the print head assembly is a moving part, it is difficult to maintain a uniform air flow from the blowers to the print head assembly; and it is highly desirable, from the viewpoint of accurate droplet placement, that the air flow conditions around the droplet path be quite stable. That is, ink droplets are very small and influenced in trajectory by low-velocity air currents so that uniform air flow, in a direction generally parallel to the droplet flight path is highly desired for optimum print quality.

SUMMARY OF THE INVENTION

The purpose of this invention is to solve the above-described problems connected with dust or debris in ways that avoid the disadvantages of prior art approaches and achieve high printing quality. Thus one significant objective of the present invention is to provide, in ink jet printing apparatus, improved structure for preventing paper dust and other such debris from reaching critical zones within the apparatus print head assembly. Another objective is to provide a protected droplet flight zone which is free from debris and non-stable air currents that adversely affect droplet trajectory.

These objects are achieved in accordance with one embodiment of the present invention by providing in ink jet printing apparatus of the type having (i) a print head assembly, including an orifice plate for directing droplets toward a print substrate and (ii) means for providing relative movement between the print head assembly and a print substrate, an improved protection structure comprising wall means that substantially encloses a region around tne orifice plate from external air and has a droplet outlet, an air inlet passage into the region enclosed by such wall means and means for filtering air flowing into the enclosed region through the air inlet passage.

By virtue of such structure, and in accord with the procedures of the present invention, the printing movements of ink droplets and/or relative print-head/print-medium movement induces external air to flow through said filtered inlet passage, into the enclosed region and out of the droplet stream outlet in a stable manner. In one preferred embodiment, continuous droplet streams provide the predominant inducing energy for such protective air flow. In another preferred embodiment, the movement of print substrate provides the predominant energy for inducing such protective air flow. In other preferred embodiments the droplet stream and substrate movement energies can be utilized to effect protective air flow.

Certain embodiments of the present invention are constructed to provide induced air flow that protects lower print head structures (e.g. a charge plate and/or a droplet catcher assembly) as well as the orifices of the ink jet printing apparatus. Also, certain embodiments cooperate with a start-up, maintenance and/or storage station to facilitate wet print head storage and/or the supply of pressurized air for cleaning of the print head assembly.

BRIEF DESCRIPTION OF THE DRAWINGS

The subsequent description of preferred embodiments of the present invention refers to the attached drawings wherein.

DESCRIPTION OF THE PREFERRED EMBODIMENTS

Figure 1:
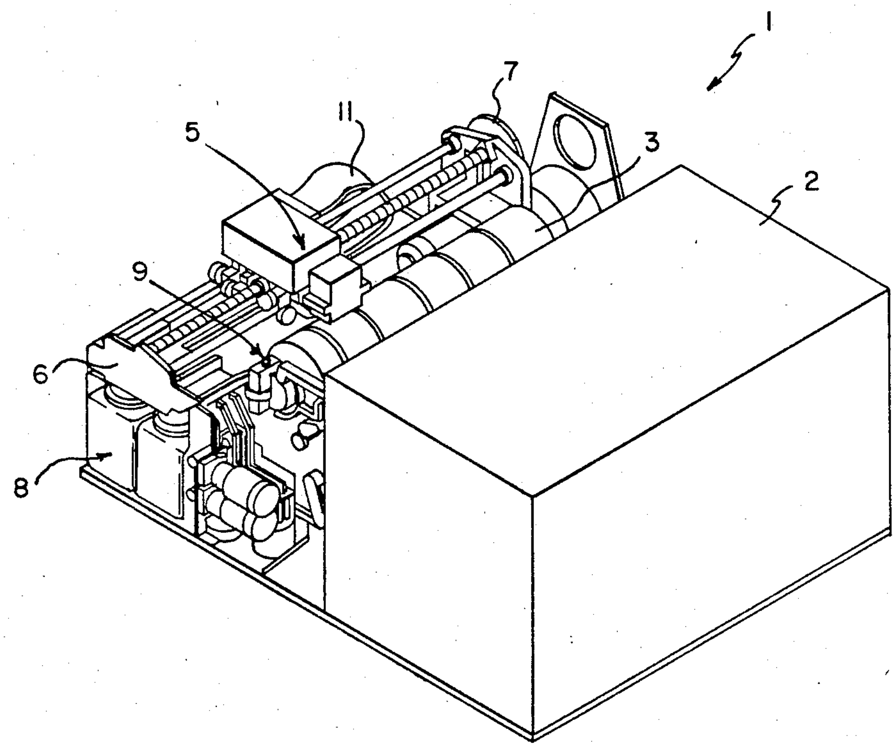
FIG. 1 is a perspective view of one embodiment of ink jet printer printing apparatus that can advantageously employ the present invention.

FIG. 1 illustrates schematically an exemplary ink jet printing apparatus 1 with which the present invention is useful. In general, the apparatus 1 comprises a paper feed and return sector 2 from which sheets are transported into and out of operative relation on printing cylinder 3. The detail structure of paper feed and return components do not constitute an essential part of the present invention and need not be described further. Also illustrated generally in FIG. 1 is the apparatus print head assembly 5 which is mounted for movement along carriage assembly 6 by appropriate drive means 7. During printing operation the print head assembly is traversed across a print path in closely spaced relation to a print substrate, e.g. a paper sheet, which is rotating on cylinder 2. Ink is supplied to and returned from the print head assembly by means of flexible conduits 11 which are coupled to ink cartridges 8. A storage, start-up and/or maintenance station 9 is constructed adjacent the left side (as viewed in FIG. 1) of the operative printing path of print head assembly 5. The drive means 7 and carriage assembly 6 are constructed to transport the print head assembly into operative relations with station 9 at appropriate sequences (e.g. storage, start-up or maintenance).

Figure 2:
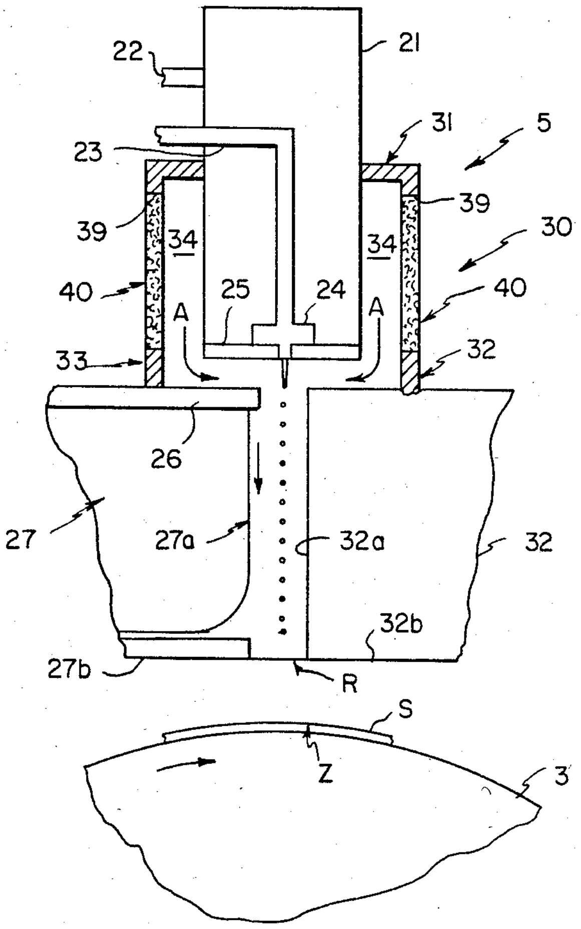
FIG. 2 is an enlarged cross-sectional view of one preferred embodiment of the present invention.

Referring to FIG. 2, one embodiment of print head assembly 5 according to the present invention can be seen in more detail. The assembly 5 includes an upper print head portion including a print head body 21 mounted on housing 22 for movement by the carriage assembly 6. The body 21 has an ink inlet passage 23 leading to a print head cavity 24 and an outlet (not shown), leading from the cavity 24 to an ink recirculation system. The upper print head portion also includes an orifice plate 25 and suitable transducer means (not shown) for imparting mechanical vibration to the body 21. Such transducer can take various forms known in the art for producing periodic perturbations of the ink filament(s) issuing from the orifice plate 25, thus stimulating break-up of the ink filaments into streams of uniformly spaced ink droplets. One preferred construction for the print head body and transducer is disclosed in U.S. application Ser. No. 390,105, entitled "Fluid Jet Print Head" and filed June 21, 1982, now a continuation-in-part of Ser. No. 06/777,102, filed Sept. 17, 1985 in the name of Hilarion Braun; however, a variety of other constructions are useful in accord with the present invention. Preferred orifice plate constructions for use in accord with the present invention are disclosed in U.S. Pat. No. 4,184,925; however, a variety of other orifice constructions are useful.

The lower portion of print head assembly 5 includes a charge plate 26, constructed to selectively impart charge to ink droplets at the point of filament break-up, and a drop catcher configuration 27 that is constructed and located to catch non-printing droplets (in this arrangement charged droplets). Exemplary preferred charge plate constructions are disclosed in U.S. application Ser. No. 517,608, entitled "Molded Charge Electrode Structure" and filed July 27, 1983, now abandoned, further filed as a continuation-in-part of Ser. No. 06/696,682, now U.S. Pat. No. 4,560,991 in the name of W. L. Schutrum and in U.S. Pat. No. 4,223,321; however, other charge plate constructions are useful in accord with the present invention. Exemplary catcher configurations are described in U.S. Pat. Nos. 3,813,675; 4,035,811 and 4,268,836; again other constructions are useful.

During the printing operation a plurality of ink filaments are ejected through the orifices in plate 25 and, under the influence of the transducer on body 21, break up into streams of uniformly sized and spaced droplets. The electrodes on charge plate 26 are addressed to selectively charge each droplet in each of the streams in accordance with information signals. In accord with the embodiment disclosed in FIG. 2, charged droplets are deflected onto the surface of catcher 27. The non-printing droplets which impact the catcher are recirculated back to the ink print head, while uncharged droplets pass on to the print substrate S as it rotates through the droplet impact zone Z of the apparatus. It will be appreciated that the print substrates (e.g. paper sheets) passing adjacent the print station cause a likelihood for dust (e.g. from, or carried by, the paper) coming into contact with the orifice plate, charge plate and catcher elements of the print head assembly.

The FIG. 2 embodiment provides one construction, in accord with the present invention, for protecting those critical elements from such dust contamination. Thus, in the FIG. 2 embodiment wall means are provided for substantially enclosing the orifice plate 25, the charge plate 26, the catcher assembly 27 and a major portion of the ink droplet path from external air. In this embodiment the wall means, denoted in general 30, comprises a top wall portion 31, front and rear wall portions 32 and 33 and side wall portions 34 (only one of which is illustrated in the FIG. 2 cross-section). The wall means 30 is also constituted by surface 32*a* of the front wall 32 and the opposing surface 27*a* of catcher 27 so as to extend to a perimetrical region R that is closely adjacent the print path for substrate S.

Also, according to the present invention, the FIG. 2 embodiment includes means defining an air inlet 39, which provides a passage for air flow into the region enclosed by wall means 30, and filtering means 40 for filtering air flowing through inlet 39 into the upper portion of the space substantially enclosed by wall means 30. In the FIG. 2 embodiment the filtering means 40 comprises air filters supported by upper sections of the wall portions 32 and 33; however the various other constructions that remove dust particles from air flowing into the region enclosed by wall means 30, can be utilized.

The FIG. 2 embodiment of the invention is adapted to utilize predominantly the energy of the ink droplet streams to induce an air flow that protects the critical portions of its print head assembly from paper dust, etc. Specifically, the streams of ink droplets, which issue from the orifice plate in the normal course of printing operations, entrain air along their flight paths and thus induce a zone of decreased air pressure within the lower region enclosed by wall means 30. This low pressure zone in turn induces air external of the wall means 30 to flow through inlet passages 39, and filters 40, along the paths indicated by arrows "A" in FIG. 2. Thus a continuous air stream exits at the perimetrical region R of housing 30, and prevents dust particles associated with the print medium from moving inside the housing. The charge and orifice plates and the droplet catcher surfaces are therefore protectively air-screened using energy of normal printing functions.

The air flow induced by approximately 60 droplet streams (comprised of droplets with 0.006" spacings and traveling at about 10 meters/sec.) has been found to work well in protecting the critical print head elements from debris with a droplet exit width (between 27*a* and 32*a* at region R) of about 0.03 inches. However, other droplet stream parameters will function effectively. In the FIG. 2 embodiment, it is highly preferred that the walls 27*a* and 32*a* are sufficiently closely spaced and cooperatively configured so that the flow of filtered air A passing therebetween is laminar in the direction of the droplet stream.

Figure 3:
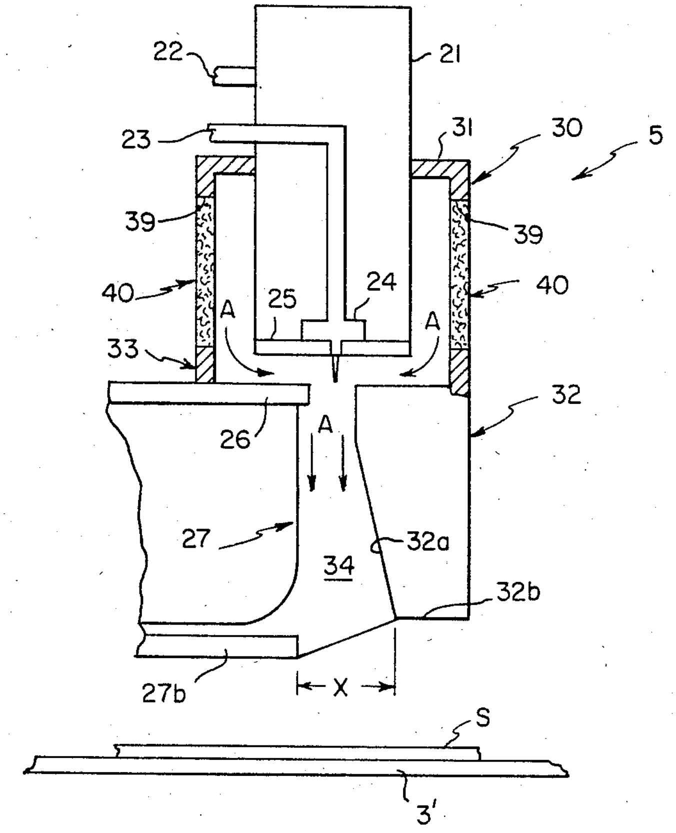
FIG. 3 is an enlarged cross-sectional view of another preferred embodiment of the present invention.

FIG. 3 illustrates an embodiment of the invention wherein another normal printing function (viz relative movement between the print head and print medium) is employed to induce protective air flow for critical print head structures. More particularly, as the print substrate S is fed rapidly past the print zone by transport 3', it creates a film of boundary layer air traveling with it. By constructing lower surface 32*b* (which forms a downstream transverse portion of wall means 30) to be further spaced from the transport 3' than the lower surface 27*b* of catcher 27 (which forms an upstream transverse portion of wall means 30), an air control zone is defined for the boundary air film passing the print head assembly. Thus, a low pressure region is generated upstream of the catcher 27 by the entrainment of the air the boundary layer air flow and the constriction and expansion of this combined air flow. This low pressure region induces the siphoning of air through inlets 39 and along the path indicated by arrows "A". In an embodiment such as shown in FIG. 3, air flow induced by print substrate movement of about 80 in./sec. or more has been found sufficient to provide protection of the print head assembly independent of any ink jet stream operation. Lower velocities are useful to provide enhancement of the air flow with the ink streams operating. One useful spacing configuration of the wall means vis-a-vis the print substrate 3' (with substrate velocities in the range of about 80–120 inches per second) is for the upstream wall portion 27*b* to be about 0.025 inches from the substrate passing the print zone and for the downstream wall portion 32*b* to be about 0.060 inches from the substrate, with the spacing between 27*b* and 32*b* about 0.080 inches. Various other spacings that provide a constriction of the air moving with the substrate, followed by an expansion proximate the region where ink droplets leave the protection of wall means 30, will be useful in accord with the present invention.

In the FIG. 3 embodiment of the present invention, the interior surface configuration of the lower portions of wall means 30 are constructed to increase in cross-sectional dimension from a relatively constricted air flow region proximate the charge plate 26 to a relatively expanded region at the perimetrical region adjacent the print path. This configuration is useful to provide high velocity air flow proximate the charge plate 26 without causing disruptive turbulence within wall means 30.

The FIG. 3 embodiment thus can rely predominantly on the energy of the transport medium to induce a filtered protective air flow for the critical elements of the print head assembly. This aspect is useful in applications where continuous jet streams are not always operating, e.g. in drop on demand jet printers or continuous printers which have periods wherein the print head is over moving print media with their flow inducing jet streams not operating. In some applications it may be desired to utilize both the energies of the ink jet stream(s) and the relative movement between the print head and the print substrate to maintain continuous flow of protective air.

Considering now both the FIGS. 2 and 3 embodiments, it has been found that the wall means 32 provides another highly desired function. Thus, as the combined flow, of protective air from within wall means 30 and the air driven by the print medium, passes from beneath surface 32*b*, it enters another expansion region. This results in a vortex flow pattern downstream of wall 32 and that wall is important to shield the droplet flight path from the influence of the unstable vortex flow.

Figure 4:
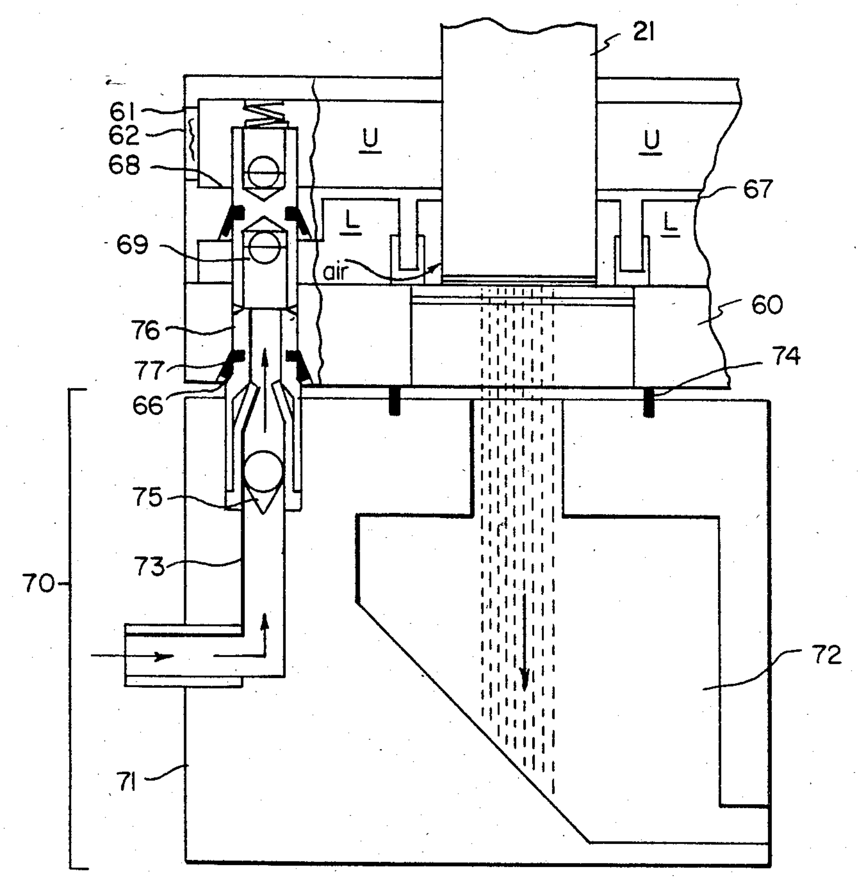
FIG. 4 is a cross-sectional views of another preferred embodiment of the present invention.

FIG. 4 illustrates another embodiment of the present invention wherein the wall means 60, inlet passage 61 and filter 62 are adapted to provide protective air flow as described with respect to FIGS. 2 and 3 and additionally to cooperate with a storage and start-up 70 station of the printer apparatus. Elements which can be substantially the same as described with respect to FIGS. 2 and 3 are given the same numeral as previously used.

The storage and start-up station 70 is shown in FIG. 4 and in general comprises a housing 71 having an ink sump cavity 72 and an air inlet passage 73 formed therein. A sealing member 74 is located around an upper portion of the housing in a configuration adapted to provide a peripheral seal around the ink stream outlet of the wall means 60 when the print head assembly is moved into engagement with station 70. A check valve 75 is located in air inlet 73 and biased to a normally closed condition. The upper portion of air inlet conduit 73 has a male portion 76 and a seal 77 that are adapted to interfit with a start-up air inlet 66 in the housing 60. The functions of station 70 are described in detail in concurrently filed U.S. application Ser. No. 06/722,551, entitled "Ink Jet Printing System Having a Wet Storage System" and concurrently filed U.S. application Ser. No. 06/722,545, entitled "Ink Jet Printing Apparatus Having an Improved Start-Up System", which are incorporated herein by reference. In general the station 70 provides for sealing the orifice and charge plates and catcher assembly from the external atmosphere during non-use and for introducing pressurized air through conduit 73 to skive clean the charge plate and catcher assembly during maintenance and start-up cycles.

The embodiment of the present invention shown in FIG. 4 illustrates the advantages of the print head structure, such as described above, for cooperating in the storage and start-up functions, while maintaining the capabilities of siphoned protective air flow during normal printing operations. Thus, the enclosed upper chamber formed by walls means 60 of the FIG. 4 embodiment is divided into an upper and lower plenum "U" and "L" by an interior wall 67 having a passage 68 between the plenums. A spool valve 69 is mounted in passage 68 and is spring-biased to a downward position wherein air can flow between the upper and lower plenums through passage 68 (i.e. through spool valve 69) and the inlet 66 is closed by valve 69. As shown by arrows "A" in FIG. 4, induced air flow through filter 62 can therefore pass down into lowre plenum L and through the ink stream outlet as previously described. Thus protective air flow is provided during printing.

During storage and start-up operations the valve 69 closes the communication between the upper and lower plenums (as shown in FIG. 4) so that the pressurized air from conduit 73 is directed past the orifice and charge plates and out through the ink stream outlet. Because upper plenum is closed the pressurized air from conduit 73 does not escape from outlet 61.

Figure 5:
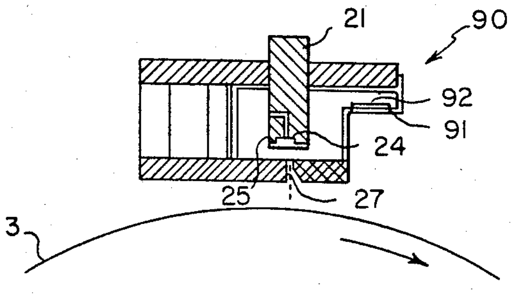
FIGS. 5 and 6 are schematic cross-sectional views of another preferred embodiment of the present invention.
Figure 6:
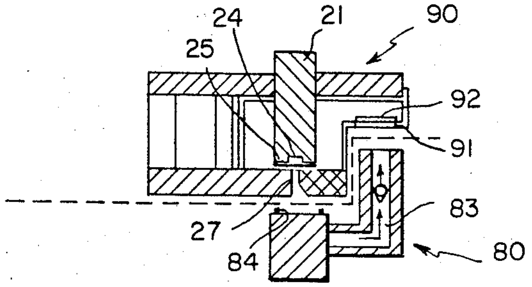

FIGS. 5 and 6 disclose another preferred embodiment of the present invention which is constructed to provide a common inlet for the protective air flow induced by the droplet streams and for the pressurized air supplied by storage and start-up station 80. As shown in FIG. 6, the common inlet 91 is formed in a portion of the wall means 90 that is extended downstream from the ink stream outlet and has a filter 92 as previously described. The outlet is adapted to cooperate with an air inlet conduit 83 of the station 80 to receive pressurized air and the walls around the ink stream outlet of the print head assembly are adapted to make in sealing relation with sealing means 84 of station 80. This embodiment is desirable for eliminating the need for separate plenums within the upper wall means and the valving interaction with the home station that was described with respect to FIG. 4. The downstream location of the inlet 91 positions the filter 92 so that paper dust does not readily clog it. This embodiment also lessens the flow restriction of air siphoned into the enclosure of wall means 90.

The invention has been described in detail with particular reference to preferred embodiments thereof, but it will be understood that variations and modifications can be effected within the spirit and scope of the invention.

What is claimed is:

1. In ink jet printing apparatus of the type having (i) a print head assembly, including an orifice plate which forms a droplet stream(s) directed toward a droplet impact zone and (ii) means for providing relative movement between said print head assembly and a print substrate, the improvement comprising:
- (a) wall means for forming a substantially enclosed region around said orifice plate, said wall means having an outlet for such droplet stream(s);
- (b) means for forming an air inlet passage such that external air can flow from the exterior of said wall means to a portion of said enclosed region, that is upstream, with respect to the droplet flight direction, from said orifice plate; and
- (c) means for filtering air passing into said enclosed region through said inlet passage, whereby protective air will be induced to flow into said enclosed region through said inlet passage and out of said enclosed region through said outlet by printing movements of ink droplets and/or relative movement between said print head assembly and print substrate.

2. The invention defined in claim 1 wherein said wall means outlet is proximate the droplet impact zone.

3. The invention defined in claim 1 wherein said print head assembly includes a droplet charge plate and droplet catching means and the operative surfaces of said charge plate and catching means are within said substantially enclosed region.

4. The invention defined in claim 3 wherein said catching means forms a part of said wall means.

5. The invention defined in claim 1 wherein said wall means extends to a perimetrical region, closely adjacent the locus of said print substrate, and said perimetrical region defines said outlet.

6. The invention defined in claim 5 wherein interior surfaces of said wall means form an air passage such that air flow from said inlet to said outlet is laminar in the direction of the droplet stream(s).

7. The invention defined in claim 5 wherein the surface of said wall means at said perimetrical region is constructed for sealing engagement with a closure member.

8. The invention defined in claim 5 wherein one transverse portion of said perimetrical region is spaced further from the print substrate locus than the other transverse portion of said perimetrical region so as to enhance induced air flow via the print head/print substrate relative movement.

9. The invention defined in claim 5 wherein the transverse portions of said perimetrical region are approximately equally spaced from said print substrate locus whereby said droplet movements provide the predominant inducing force for protective air flow.

10. The invention defined in claim 1 wherein said inlet to said enclosed region is located remotely from the locus of said print substrate so as to avoid clogging of said filter means.

11. The invention defined in claim 10 wherein said inlet is spaced further from the locus of said print substrate than said orifice plate.

12. In continuous ink jet printing apparatus of the type having (i) a print head assembly, including an orifice plate which forms a droplet stream(s) and a charge plate for selectively forming electrical charge on such ink droplets, and (ii) means for transporting a print substrate along a print path of said apparatus and through a droplet impact zone aligned with said print head assembly, the improvement comprising:
- (a) wall means for forming a substantially enclosed region around said orifice and charge plates, said wall means having an outlet for such droplet streams;
- (b) means for forming an air inlet passage from the exterior of said apparatus into said enclosed region at a location upstream, with respect to such droplet streams, from said orifice; and
- (c) means for filtering air passing into said enclosed region through said inlet passage, said inlet passage being located relative to said wall means outlet so that protective air will be induced to flow into said enclosed region through said inlet passage and out of said enclosed region through said outlet by printing movements of ink droplets and/or transport movement of a print substrate.

13. The invention defined in claim 12 wherein said wall means outlet is proximate the droplet impact zone.

14. The invention defined in claim 12 wherein said print head assembly includes droplet catching means and the operative surface of said catching means is within said substantially enclosed region.

15. The invention defined in claim 14 wherein said catching means forms a part of said wall means.

16. The invention defined in claim 12 wherein said wall means extends to a perimetrical region, closely adjacent said print path, and said perimetrical region defines said outlet.

17. The invention defined in claim 16 wherein interior surfaces of said wall means are constructed to form a laminar air passage from a location proximate said orifice plate to said perimetrical region.

18. The invention defined in claim 16 wherein the surface of said wall means at said perimetrical region is configured for sealing engagement with a closure member.

19. The invention defined in claim 16 wherein the one transverse portion of said perimetrical region is spaced further from the print path than the other transverse portion of said perimetrical region whereby the constriction and expansion of air following the movement of a print substrate provides a significant inducing force for such protective air flow.

20. The invention defined in claim 16 wherein the transverse portions of said perimetrical region are approximately equally spaced from said print path whereby said droplet movements provide the predominant inducing force for such protective air flow.

21. The invention defined in claim 12 wherein said inlet to said enclosed region is located remotely from said print path to avoid clogging of said filter means.

22. The invention defined in claim 21 wherein said inlet is spaced further from said print path than said charge plate.

23. The invention defined in claim 12 wherein said apparatus includes a start-up station having a source of pressurized air and said air inlet is constructed to interfit with said pressurized air source at said start-up station.

24. The invention defined in claim 12 wherein: (i) said apparatus includes a start-up station having a pressurized air source, (ii) said wall means includes a second, pressurized-air inlet that is constructed to couple with said air. source and (iii) said print head assembly includes valve means that is resiliently urged to a condition closing said second inlet and opening said filtered air inlet and is movable by engagement with said start-up station to a condition closing said filtered air passage and opening said second air inlet so that pressurized air can flow through said enclosed region to said air outlet.

25. A method of protecting print head structure including an orifice plate of ink jet printing apparatus from dust borne by relatively moving print substrate material, said method comprising:

(a) substantially enclosing the droplet path from the print head to the print substrate material; and (b) inducing a protective air flow substantially upstream of said plate along the droplet path from a filtering inlet passage toward the print substrate material by means of a nominal printing function(s) of the ink jet printing apparatus.

26. The method of claim 25 wherein said inducing step is effected predominantly by entraining air with ink droplets moving along said droplet path.

27. The method of claim 25 wherein said inducing step includes constructing air that is moving with said print substrate material at a region upstream of the printing zone and effecting expansion of that air proximate the printing zone.

* * * * *